United States Patent [19]
Barker et al.

[11] Patent Number: 5,843,592
[45] Date of Patent: *Dec. 1, 1998

[54] CURRENT COLLECTOR FOR LITHIUM ION ELECTROCHEMICAL CELL

[75] Inventors: Jeremy Barker, Henderson, Nev.; Rene Koksbang, Odense S, Denmark

[73] Assignee: Valence Technology, Inc., Henderson, Nev.

[ * ] Notice: This patent issued on a continued prosecution application filed under 37 CFR 1.53(d), and is subject to the twenty year patent term provisions of 35 U.S.C. 154(a)(2).

[21] Appl. No.: 735,756

[22] Filed: Oct. 23, 1996

[51] Int. Cl.$^6$ ................................................. H01M 10/44
[52] U.S. Cl. ............................................ 429/50; 429/192
[58] Field of Search ................................. 429/192, 209, 429/245, 212, 50, 194; 29/623.1

[56] References Cited

U.S. PATENT DOCUMENTS

| | | |
|---|---|---|
| 4,222,903 | 9/1980 | Heeger et al. . |
| 4,579,679 | 4/1986 | Papir . |
| 4,804,594 | 2/1989 | Jow et al. . |
| 5,028,500 | 7/1991 | Fong et al. ............................ 429/194 |
| 5,256,730 | 10/1993 | Gan et al. . |
| 5,262,254 | 11/1993 | Koksbang et al. ...................... 429/192 |
| 5,326,653 | 7/1994 | Chang ..................................... 429/162 |
| 5,368,959 | 11/1994 | Koksbang et al. ...................... 429/212 |
| 5,536,601 | 7/1996 | Koksbang et al. ................... 429/192 X |
| 5,554,460 | 9/1996 | Wu et al. ............................ 429/191 X |

OTHER PUBLICATIONS

Liu et al., "Nucleophilic Substitution Reactions of Polyaniline with Substituted Benzenediazonium Ions: A Facile Method for Controlling the Surface Chemistry of Conducting Polymers", Chem. Mater., 1996, vol. 8, 1164–1166 (No Month).

Hanna et al., "Synthesis and Characterization of New Processible Conducting Copolymers Derived from Thiophenes", Chem. Mater., 1996, vol. 8, 1512–1518 (No Month).

Henderson et al., "Thiophene: Alkylthiophene Copolymers from Substituted Dialkyloligothiophenes", Chem. Mater., 1995, vol. 7, 1879–1889 (No Month).

J. Barker, "An Electrochemical Investigation of the Doping Process in Poly(thienylene vinylene)", Synthetic Metals, (1989), vol. 32, 43–50 (No Month).

Herbert Naarmann, "New Aspects on Intrinsically Conducting Organic Systems and Their Synthesis", Makromol. Chem., Macromol. Symp. (1987), vol. 8, 1–15 (No Month).

Jow et al, "A Rechargeable Cell Based on a Conductive Polymer/Metal Alloy Composite Electrode", J. Electrochem. Soc., (1989), vol. 136, 1–6 (No Month).

*Primary Examiner*—Anthony Skapars
*Attorney, Agent, or Firm*—Robert Krebs

[57] ABSTRACT

Electrochemical cells having a current collector that includes a redox polymer film affords overdischarge protection. The redox polymers can reversibly insert anions and/or cations during oxidation and/or reduction thereby rendering the polymers conductive relatively to their neutral state.

16 Claims, 1 Drawing Sheet

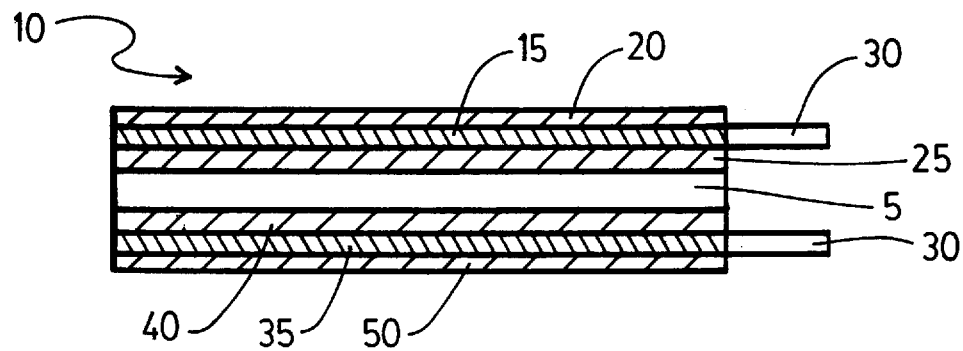
FIG._1.
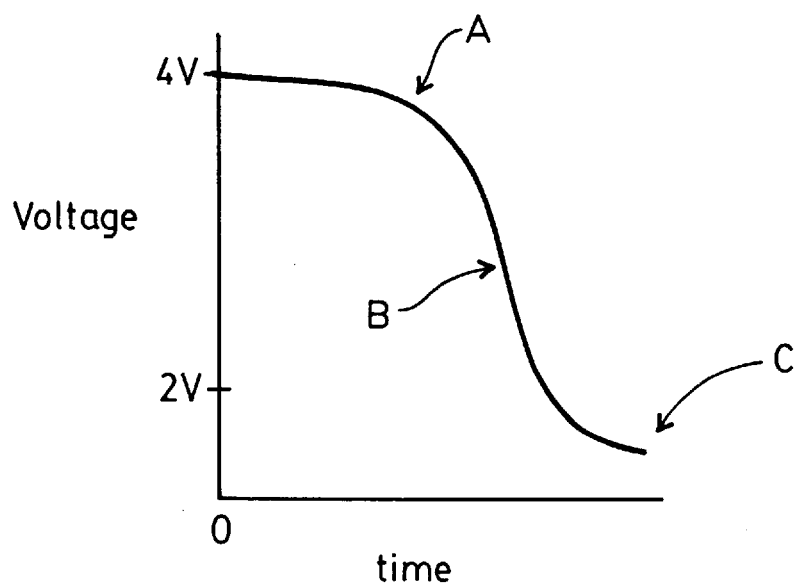
FIG._2.

CURRENT COLLECTOR FOR LITHIUM ION ELECTROCHEMICAL CELL

FIELD OF THE INVENTION

The present invention relates to electrochemical devices and, more particularly, to non-aqueous electrochemical cells having overdischarge protection.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Graphite is a preferred carbon anode material because cells employing graphite anodes produce non-sloping voltage profiles and the voltage for insertion is close to that of lithium metal. Non-aqueous lithium electrochemical cells are discussed in U.S. Pat. Nos. 4,472,487, 4,668,595 and 5,028,500.

Successful use of lithium batteries depends on their safety during operations under normal conditions and even under abusive usage. An abusive use such as rapid overdischarging of the battery will damage the cell and may even initiate self heating of the battery, as opposed to merely resistive heating, leading to thermal runaway.

SUMMARY OF THE INVENTION

The present invention is based in part on the discovery that the employment of a current collector comprising a redox polymer film can provide effective overdischarge protection for electrochemical cells.

In one aspect, the invention relates to an electrochemical cell that includes:
(i) an anode;
(ii) a cathode;
(iii) interposed between the anode and cathode, an electrolyte comprising an electrolyte solvent and salt; and
(iv) adjacent to at least one of the anode or the cathode, on a side opposite to the electrolyte, a current collector comprising a redox polymer film.

In another aspect, the invention relates to an electrochemical cell that includes
(i) an anode having an anode current collector comprising a redox polymer film;
(ii) a cathode having a cathode current collector comprising a redox polymer film; and
(iii) an electrolyte interposed between said anode and cathode that comprises an electrolyte solvent and salt.

In yet another aspect, the invention relates to a method of fabricating an electrochemical cell that includes the steps of:
providing an anode;
providing a cathode that has current collector comprising a redox polymer film; and
positioning an electrolyte comprising an electrolyte solvent and salt between said anode and cathode.

Preferred redox polymers include for example polyaniline, polythiophene, alkyl substituted polythiophene, polypyrrole, alkyl substituted polypyrrole, polyfuran, alkyl substituted polyfuran, polyphenylene vinylene, and polythiophene vinylene. In a preferred embodiment, the cathode current collector has a redox polymer film wherein the polymer is in the oxidized state.

BRIEF DESCRIPTION OF THE DRAWINGS

FIG. 1 is a cross-sectional view of an electrochemical cell; and

FIG. 2 is a graph of voltage vs time showing the change in conductivity of a redox polymer that can be employed to fabricate a current collector.

DETAILED DESCRIPTION OF THE PREFERRED EMBODIMENTS OF THE INVENTION

The present invention is based in part on the discovery that overdischarging of rechargeable lithium batteries can be effectively prevented by employing current collectors therein that comprise a redox polymer so that each current collector is essentially non-conducting when the redox polymer is in the non-oxidized or non-reduced state. The current collector may comprise a film of the redox polymer or may comprise a metal foil that is coated with the redox polymer.

As shown in FIG. 1 a preferred embodiment of the electrochemical cell 10 comprises anode, cathode, and polymeric layers that are fused together. The current collector 15 has anode material 20 and 25 coated on the upper and lower surfaces, respectively. Similarly, current collector 35 has cathode materials 40 and 50 coated on the upper and lower surfaces, respectively. A tab 30 protrudes from each current collector. Electrolyte layer 5 contains the electrolyte solution comprising the electrolyte solvent and the salt. A plurality of electrochemical cells can be stacked to form a battery wherein all the anode tabs are welded together and electrically connected to an anode lead (e.g., nickel) and all the cathode tabs are welded together and electrically connected to a cathode lead. The leads are connected to an external load when the battery is in use.

One or both of the current collectors may comprise the redox polymer. When only one current collector is so constructed, preferably it is that cathode current collector. Although FIG. 1 illustrates an embodiment where the anode and cathode structures each has electrode materials (or films) laminated onto both sides of the current collectors, it is understood that for single electrochemical cell only one side of the anode and/or cathode current collector is laminated with the anode or cathode material. That is, films 20 and/or 50 on the outer surfaces of the current collectors are optional.

However, prior to describing this invention in further detail, the following terms will be defined.

The term "redox polymer" refers to an electronically conducting polymer that is capable of reversibly inserting anions and/or cations during oxidation and/or reduction. The oxidation and/or reduction is normally accompanied by significant changes in electronic conductivity. In its natural state, the redox polymer has an electronic conductivity of less that about $10^{-5}$ S/cm and more preferably less that about $10^{-7}$ S/cm. Conversely, in its oxidized or reduced state, the redox polymer preferably has an electronic conductivity of greater than 1 S/cm, more preferably greater than 10 S/cm, and most preferably greater than 100 S/cm. The actual electronic conductivities for these states will depend on the particular redox polymer or polymer mixtures, the degree of doping (i.e., oxidation or reduction), dopant species, the thickness of the polymer film, temperature and other operating parameters of the electrochemical cell. Preferred redox polymers include, for example, polyaniline, polythiophene (including alkyl substituted polythiophenes), polypyrrole (including alcyl substituted polypyrroles), polyfuran (including alkyl substituted polyfurans), polyphenylene vinylene, polythiophene vinylene, and mixtures thereof. Each polymer will have a unique voltage for operation. Other suitable electronically conducting polymers that can be employed as redox polymers are described in U.S. Pat. Nos. 5,256,730, and 4,804,594, and Liu et al., "Nucleophilic Substitution Reactions of Polyaniline with Substituted Benzenediazonium Ions: A Facile Method for Controlling the Surface Chemistry of Conducting Polymers", Chem. Mater., 1996, Vol. 8, 1164–1166, Hanna et al., "Synthesis and Characterization of New Processible Conducting Copolymers Derived from Thiophenes", Chem. Mater., 1996, Vol. 8, 1512–1518, Henderson et al., "Thiophene: Alkylthiophene Copolymers from Substituted Dialkyloligothiophenes", Chem. Mater., 1995, Vol 7, 1879–1889, J. Barker, "An Electrochemical Investigation of the Doping Process in Poly(thienylene vinylene)", Synthetic Metals, (1989), Vol 32, 43–50, Herbert Naarmann, "New Aspects on Intrinsically Conducting Organic Systems and Their Synthesis", Makromol. Chem., Macromol. Symp. (1987), Vol 8, 1–15, and Jow et al, "A Rechargeable Cell Based on a Conductive Polymer/Metal Alloy Composite Electrode", J. Electrochem. Soc., (1989) Vol. 136, 1–6, all of which are incorporated herein.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability liquid solvents (e.g., diethyl ether) or by supercritical fluids for example. Preferred plasticizers include, for example, dibutyl phthalate, dioctylphthalate, and acetates, glymes, and low molecular weight polymers.

In operation, for fabricating a solid polymeric matrix and composite electrode that includes polymeric binders, for example, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and solid polymeric matrix. The anode and/or cathode may each include a current collector. For a liquid electrolytic cell, a separator made of any suitable material such as, for example, glass fiber, polyethylene, or polypropylene is employed instead of a solid polymeric matrix.

The term "activation" refers to the placement of an electrolyte solution into the porous portions of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. The solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283 which is incorporated herein), urethane acrylate, vinyl sulfonate polyalkylene oxides (as disclosed in U.S. Pat. No. 5,262,253, which is incorporated herein), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product may contain repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidenedifluroide and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, may be added in the electrolyte to reduce the level of irreversible reactions.

For electrochemical cells where (1) the cathodic material comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anodic material comprises graphite or other carboneous material such as petroleum coke or a lithium intercalation material with a low operating voltage such as, for example, $WO_3$ and $SnO_2$. The electrolytic solvent preferably comprises a mixture of ethylene carbonate and dimethyl carbonate.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an cyclic aliphatic carbonate for use within the scope of this invention. See, for instance, U.S. Pat. No. 4,115,206, which is incorporated herein.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein. Additional suitable cyclic aliphatic carbonates are disclosed in U.S. Pat. No. 4,747,850 which is also incorporated herein.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100 k polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. The carbon intercalation based anode precursors typically include a polymeric binder and extractable plasticizer suitable for forming a bound porous composite having a molecular weight of from about 1 k to 5,000 k. Examples of suitable polymeric binders include EPDM (ethylene propylene diamine termonomer), PVDF (polyvinylidene difluoride), HFP (hexafluoropropylene), EAA (ethylene acrylic acid copolymer), EVA (ethylene vinyl acetate copolymer), EAA/EVA copolymers, and copolymers of PVDF and HFP and the like. In one preferred embodiment, the carbon intercalation anode precursor (that is, the anode structure prior extraction) comprises from about 40 to about 70 weight percent of a carbon material (e.g., graphite); from about 8 to about 20 weight percent of a polymeric binder; and from about 15 to about 40 weight percent plasticizer. The anode may also include an electron conducting material such as carbon black.

The cathode typically comprises a cathodic material or cathode active material (i.e., insertion compound) which is any material which functions as a positive pole in a solid electrolytic cell. Such cathodic materials are well known in the art and include, by way of example, transition metal oxides, sulfides, and selenides, including lithiated compounds thereof. Representative cathodic materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq 2$. Blends can also include $Li_y$-$\alpha$-$MnO_2$ ($0\leq y<1$) which has a hollandite-type structure. $Li_y$-$\alpha$-$MnO_2$ where $0\leq y<0.5$ is preferred. $\alpha MnO_2$ can be synthesized by precipitation from a reaction between a $MnSO_4$ solution and $(NH_4)_2S_2O_8$ as an oxidizing agent.

Lithiation (also referred to as "prelithiation") of $\alpha MnO_2$ can be accomplished via a solid state reaction:

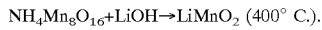

$NH_4Mn_8O_{16}+LiOH\rightarrow LiMnO_2$ (400° C.).

Li-$\alpha$-$MnO_2$ retains the same structure as Hollandite. See, Botkovitz et. al., J. of Power Sources, 43–44 (1993) 657–665, which is incorporated herein, for a discussion of the structure and electrochemical characteristics of Li-$\alpha$-$MnO_2$. $Li_y$-$\alpha$-$MnO_2$ $0\leq y<0.5$ is commercially available from SEDEMA, Tertre, Belgium.

In one preferred embodiment, the cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1 k to 5000 k.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM, PVDF, HFP, EAA, EVA, EAA/EVA copolymers, copolymers of PVDF and HFP, and the like; from about 0 to about 20 weight percent of polyethylene oxide having a number average molecular weight of at least 100,000; from about 10 to 50 weight percent of electrolyte solvent; and from about 5 weight percent to about 25 weight of a solid matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100 k. Preferably, the film forming agent is employed in an amount of about 1 to about 10 weight percent and more preferably at about 2.5 weight percent based on the total weight of the electrolyte composition.

METHODOLOGY

The invention will be described using the anode and cathode structures as illustrated in FIG. 1 wherein electrode materials (or films) are laminated onto both sides of the current collectors, however, it is understood that the invention is applicable to other configurations, for example, where one side of the anode and/or cathode current collector is laminated with the anode or cathode material. Moreover, the current collector can be constructed from a free standing redox polymer film, that is, a layer the polymer which is self-supported and does not require a metallic substrate. Alternatively, the current collector can comprise a metal substrate, such as, for example, a foil, screen, grid, expanded metal, woven or non-woven or knitted wire fabric formed from an electron conductive material such as metals or alloys that is coated with the redox polymer. In either case, the current collector is positioned adjacent to the anode and/or cathode on the side of the electrode which is opposite to the electrolyte layer. In this fashion, the anode and cathode maintains constant physical and electrical contact with the electrolyte layer.

Preferred methods of coating a substrate with the redox polymer include: (1) electrochemical polymerization directly onto the current collector substrate and (2) application of a solution of the redox polymer onto the substrate by spraying, dipping, and the like. The latter method is particularly suited for soluble redox polymers such as, for example, alkyl substituted polythiothene where the alkyl group is $—C_3H_7$ or $—C_4H_9$. Any suitable organic solvent such as chloroform or methyl chloride can be employed. If a soluble redox polymer is used the electrolyte solvent selected for used in the battery must be one which does not dissolve the coated polymer.

Generally, it is easier to oxidize redox polymers than to reduced them since they will more readily accommodate anions than cations. For use in lithium ion electrochemical cells, a redox polymer is reduced by doping it with lithium ions and the polymer is oxidized by doping it with suitable anions, such as $PF_6^-$. Preferably, in the case of oxidation, the redox polymer is doped with the same species of counter ion(s) of the lithium salts that is employed in the electrolytic solvent. Oxidation can be readily achieved by conventional electrochemical methods. Moreover, relatively stable oxidized redox polymers such as doped polyaniline are commercially available. Given that oxidization of redox polymer is easier to achieve, a preferred method of fabricating electrochemical cell comprises employing a cathode current collector having a film of redox polymer that is initially in either the oxidized or neutral state. Though the redox polymer is initially in the neutral state, it is oxidized in situ during operation of the cell. The $PF_6-$ insertion (oxidation) should occur during charging of the cell as long as the insertion voltage roughly corresponds to the $Li^+$ extraction reaction for the cathode material.

When an anode current collector having a film of redox polymer is employed, poly(paraphenylene) which operates in the voltage range of less than 1 volt vs. $Li/Li^+$ is preferred. Under over discharge conditions, the anode redox polymer becomes un-doped (i.e., by removal of lithium ions) which renders the polymer electronically non-conductive.

Preferably, the current collector has a thickness from about 25 $\mu$m to about 75 $\mu$m, preferably about 35 $\mu$m to about 65 $\mu$m, and more preferably about 45 $\mu$m to about 55 $\mu$m. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

For current collectors that comprise redox polymers films that are coated to metallic substrates, the thickness of the film is preferably about 0.1 to about 10 $\mu$m, and more preferably about 1 to about 2 $\mu$m. When the current collectors comprises free standing redox polymers films (i.e., without metallic substrate), the thickness of the film is preferably about 2 to about 20 $\mu$m, and more preferably about 5 to about 10 $\mu$m. It is understood, that the thickness of the redox polymer will depend, in part, on the particular redox polymer(s) used.

The anode of the present invention generally comprises an anode film that is laminated onto one or both sides of a current collector. Typically, each anode film is from about 100 $\mu$m to about 250 $\mu$m in thickness, preferably about 110 $\mu$m to about 200 $\mu$m, and more preferably about 125 $\mu$m to about 175 $\mu$m. Similarly, the cathode of the present invention generally comprises a cathode film that is laminated onto one or both sides of the cathode current collector. Typically, each cathode film is from about 100 $\mu$m to about 200 $\mu$m in thickness, preferably about 130 $\mu$m to about 175 $\mu$m, and more preferably about 140 $\mu$m to about 165 $\mu$m.

The following illustrates a method of how an electrolytic cell could be fabricated. Examples 1 and 2 describe the process of preparing the anode and cathode, respectively. Example 3 describes the procedures for assembling a solid electrolytic cell.

EXAMPLE 1

The anode current collector employed was a sheet of expanded copper metal that is about 50 $\mu$m thick. It is available under the designation 2Cu5-125 (flatten) from Delker Corp., Branford, Conn. The copper metal is coated with a film of a redox polymer comprising polyaniline. The anode slurry was prepared as follows:

A polymer mixture comprising a copolymer of polyvinylidenedifluoride (PVDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite into 0.9 grams of carbon black into a solution containing 60 grams acetone, and 10.5 grams dibutyl phthalate. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willebrock, Belgium. The graphite mixture was then vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 $\mu$m thick. The aluminum grid is available under the designation 2AL5-077 from Delker Corp. The aluminum grid is coated with a film of a redox polymer comprising polyaniline. The cathode slurry was prepared as follows:

A polymer mixture comprising a copolymer of polyvinylidenedifluoride (PVDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by mixing 28.9 grams of $LiMn_2O_4$, 2.4 grams of carbon black (Super P™) into a solution containing 60 grams acetone, and 8.7 grams dibutyl phthalate. The mixture was then vigorously mixed in the a high shear mixer until a substantially homogeneous blend was formed.

The cathode slurry was prepared by mixing the polymer mixture and the cathode mixture together under low shear conditions to form the cathode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising acetone, dibutyl phthalate, silanized fumed $SiO_2$, and the PVDF/HFP copolymer on a suitable substrate or carrier web and allowing the acetone to evaporate. No curing by radiation is required. The $SiO_2$ is a filler which imparts toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that polymer or copolymer has a narrow molecular weight have range. Preferably $$\frac{M_n}{M_w} \simeq 1.0$$

Next the dibutyl phthalate plasticizer is extracted from the precursor. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide. The precursor is than pre-packaged in moisture-impermeable material which is described, for example, in U.S. Pat. No. 5,326,653 which is incorporated herein, before being activated. Activation preferably occurs in an inert (e.g., argon) atmosphere. Finally, the packaging of the electrochemical cell is sealed.

UTILITY

FIG. 2 illustrates the mechanism by which a redox polymer is able to provide overdischarge protection. At time zero, an electrochemical cell is in the fully charged state (phase "A") and the polymer is initially doped with $PF_6^-$ thereby rendering it electronically conductive. Under normal conditions, the polymer remains highly conductive during cell discharge. In normal overdischarge, essentially all the $PF_6^-$ is removed from the polymer which becomes un-doped and poorly conductive (phase "B"). In excess overdischarging, it may be possible to insert $Li^+$ into the polymer (phase "C") depending on what other reactions are taking place.

In operation, the electrochemical cell or battery is charged prior to use or recharged after each discharge. In the case of lithium electrochemical cells, lithium ions passes from the cathode active material (e.g., $Li_xMn_2O_4$) through the electrolyte and intercalate into the carbon anode. Different charging regimes can be employed. During regular charging of the electrochemical cell that is coated with a redox polymer on the cathode current collector, lithium ion is extracted from the $Li_xMn_2O_4$ from the cathode end, simultaneously, a small amount of $PF_6^-$ (counter anion from the LiPF salt) is inserted into the redox polymer so that current collector/polymer is in the oxidized state. Charging of the cell continues until it reaches the fully charged state wherein most of the lithium cations have been removed from the $Li_xMn_2O_4$ and the redox polymer has become very conductive.

During the discharge of the cell, lithium cation is reinserted into the $Li_xMn_2O_4$. Moreover, so long as no over discharge of the cell occurs, the current collectors/redox polymer remains in the highly electronically conductive state. However, should the cell become subject to over discharge conditions, the $PF_6^-$ is removed from the redox polymer thereby rendering the current collectors/redox polymer in the neutral state, thereby effectively stopping electrical flow. This stops any further deleterious reactions from taking place. For example, adverse effects during over discharge may result from copper (from the current collector substrate) that dissolves into the electrolytes given that the potential can reach >3 volts vs $Li/Li^+$ or the electrolyte decomposition which produces combustible gases e.g., EC/DMC solvents will produce methane, ethylene, and other gases.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of operating an electrochemical cell that includes an anode comprising an intercalation carbon material, a cathode comprising a lithiated cathode active material, an electrolyte comprising an electrolyte solvent and salt that forms a lithium cation and an anionic counter ion, wherein the electrolyte is interposed between the anode and cathode, and a cathode current collector which is positioned adjacent to the cathode on a side opposite to the electrolyte, wherein the cathode current collector comprises a redox polymer film and optionally a metal current collector substrate, said method comprising the steps of:

(a) charging or recharging the electrochemical cell until the cell is fully charged whereby anionic counter ions are inserted in the redox polymer which is initially in a neutral state thereby oxidizing the redox polymer to render the redox polymer electronically conductive;

(b) discharging the electrochemical cell wherein the oxidized redox polymer remains electronically conductive; and (c) overdischarging the electrochemical cell whereby essentially all of the anionic counter ions in the oxidized redox polymer are removed therefrom thereby converting the redox polymer from the oxidized state into a neutral state having an electronic conductivity of less than about $10^{-5}$ S/cm, said method characterized in that during the overdischarging step there is substantially no dissolution of the current collector substrate into the electrolyte solvent and there is substantially no decomposition of the electrolyte solvent to form gases.

2. The method of claim 1 wherein during the overdischarge step the electrochemical cell is subject to a potential of greater than 3 volts.

3. The method of claim 1 wherein the intercalation carbon material is graphite.

4. The method of claim 1 wherein the redox polymer film made of material that is selected from the group consisting of polyaniline, polythiophene, alkyl substituted polythiophene, polypyrrole, alkyl substituted polypyrrole, polyfuran, alkyl substituted polyfuran, polyphenylene vinylene, and polythiophene vinylene, and mixtures thereof.

5. The method of claim 1 wherein the cathode current collector consists essentially of a layer of the redox polymer film.

6. The method of claim 1 wherein the cathode current collector includes a metal current collector substrate comprising a foil or grid that is coated on at least one side with a film of said redox polymer.

7. The method of claim 1 wherein the anionic counter ion comprises $PF_6^-$.

8. The method of claim 1 wherein the salt comprises $LiPF_6$.

9. The method of claim 1 wherein the redox polymer film when in the oxidized state has an electronic conductivity of greater than about 10 S/cm.

10. The method of claim 1 wherein the redox polymer film when in the oxidized state has an electronic conductivity of greater than about 100 S/cm.

11. The method of claim 1 wherein the redox polymer film when in the neutral state has an electronic conductivity of less than about $10^{-7}$ S/cm.

12. The method of claim 1 wherein the electrolyte comprises a polymeric matrix.

13. The method of claim 1 wherein the electrolyte solvent comprises a carbonate selected from the group consisting of dimethyl carbonate, diethyl carbonate, propylene carbonate, ethylene carbonate, and methyl ethyl carbonate.

14. The method of claim 1 further characterized in that lithium cations are inserted into the redox polymer film.

15. The method of claim 1 wherein in the charging or recharging step, the insertion of the anionic counter ions into the redox polymer is accompanied by extraction of lithium cations from the lithiated cathode active material.

16. The method of claim 15 wherein the insertion of the anionic counter ions is characterized by a first potential and the extraction of lithium cations is characterized by a second potential and the magnitude of the first potential is about equal to the magnitude of the second potential.

* * * * *